United States Patent [19]

Kozlowski et al.

[11] Patent Number: 4,635,339
[45] Date of Patent: Jan. 13, 1987

[54] AUTOMATED WHEEL DECKING ASSEMBLING

[75] Inventors: Chester P. Kozlowski, Royal Oak; Lawrence J. Lawson, Troy, both of Mich.

[73] Assignee: Dominion Tool and Die Company, Roseville, Mich.

[21] Appl. No.: 610,845

[22] Filed: May 16, 1984

[51] Int. Cl.⁴ .................. B23P 19/00; B60B 29/00
[52] U.S. Cl. .................. 29/526 R; 29/794; 29/802; 414/426
[58] Field of Search ............ 73/146; 29/802, 526 R, 29/564, 564.1, 794, 795, 787; 414/426, 429

[56] References Cited

U.S. PATENT DOCUMENTS

| | | | |
|---|---|---|---|
| 2,757,447 | 8/1956 | Berenyi | 29/794 |
| 2,779,092 | 1/1957 | Gordon | 29/794 |
| 3,491,427 | 1/1970 | Zimmerman et al. | 414/426 |
| 4,498,243 | 2/1985 | Kashiwagi . | |

Primary Examiner—Howard N. Goldberg
Assistant Examiner—Steven Nichols
Attorney, Agent, or Firm—Harness, Dickey & Pierce

[57] ABSTRACT

An apparatus and method for assembling wheel and tire units onto a vehicle as it moves along a conveyor. The apparatus includes an arrangement for centralizing the vehicle relative to the conveyor, orienting the hubs of the vehicle so as to receive a properly oriented wheel-tire unit, an apparatus for orienting the wheel-tire unit and means for mounting the oriented wheel-tire unit on the hub and for affixing the thus mounted wheel-tire onto the hub.

12 Claims, 4 Drawing Figures

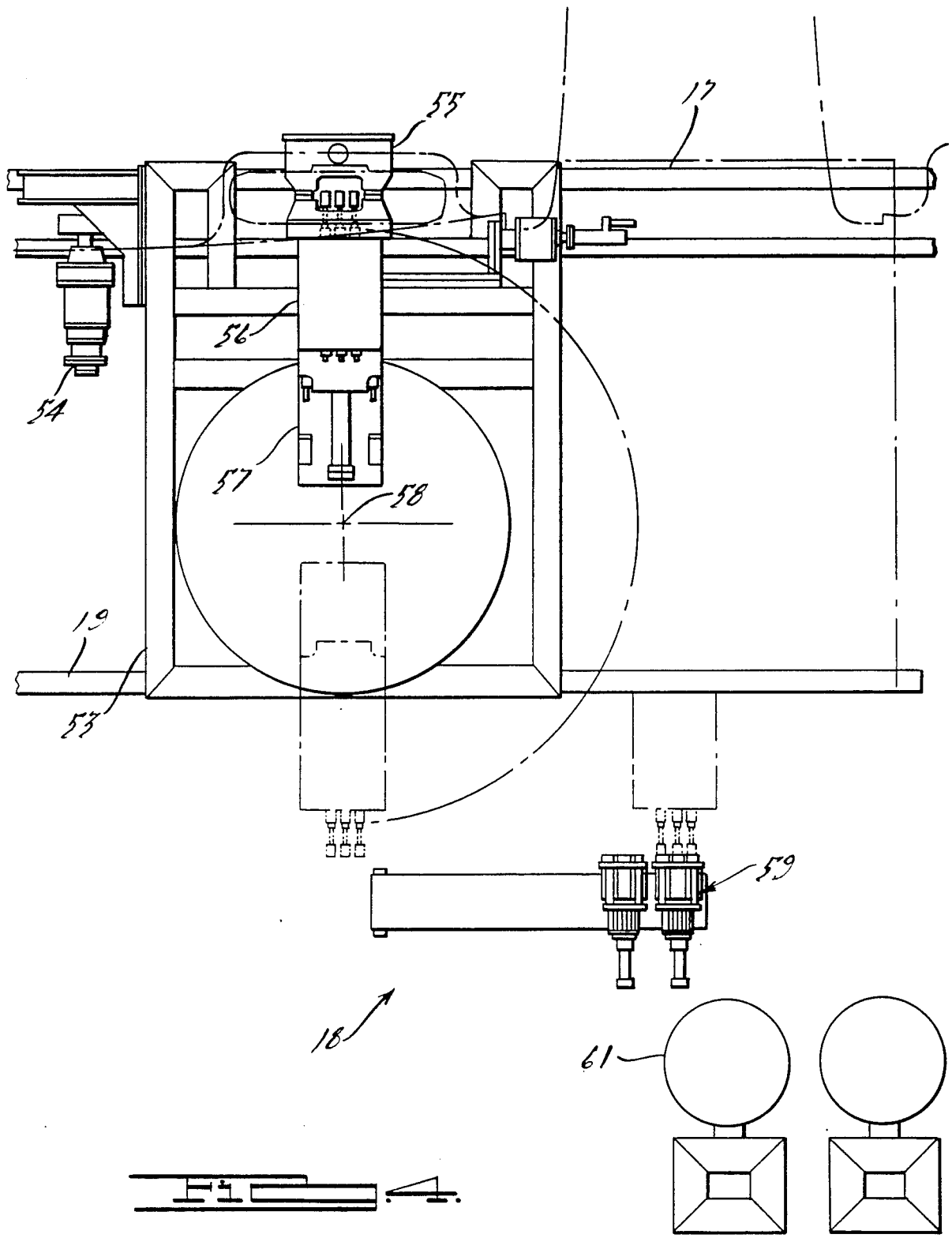

AUTOMATED WHEEL DECKING ASSEMBLING

BACKGROUND OF THE INVENTION

This invention relates to a wheel decking apparatus and method and more particularly to an improved method and apparatus for automatically mounting tires and wheels on automotive vehicles as they travel along a conveyor line.

As with many industries, the trend in the automotive industry is toward increased automation. Various steps on the assembly line previously performed manually are now done automatically. One area, however, where automation has presented significant problems is in the mounting of wheels and tires on a vehicle as it travels along an assembly line. This operation has, heretofore, resisted automation due to the difficulty in correctly positioning the vehicle on the line, correctly positioning the hubs onto which the wheels are mounted and insuring correct mounting of the appropriate wheel and tire on the correct vehicle.

It is, therefore, a principal object of this invention to provide an improved method and apparatus for mounting wheels and tires on vehicles as they travel along a conveyor line.

It is a further object of this invention to provide an improved wheel decking apparatus and method wherein the vehicle on which the wheels are to be mounted is appropriately oriented prior to the mounting step and also wherein the hubs onto which the wheels are to be mounted are also appropriately oriented.

SUMMARY OF THE INVENTION

This invention is adapted to be embodied in an apparatus for assembling wheels having attaching openings with mounted and inflated tires upon motor vehicles travelling along a conveyor. The motor vehicle has hubs with threaded fastening means for cooperation with the wheel openings for attachment of the wheel-tire unit. The apparatus in accordance with the invention comprises means for orienting each hub upon which a wheel is to be mounted with its threaded fastening means in a predetermined position. Mounting means orient a wheel-tire unit with its attaching openings positioned in alignment with the positioned threaded fastening means of the associated hub and for placing the wheel-tire unit on the hub. Means are also provided for driving cooperating threaded fastening means onto the hub threaded fastening means for securing the wheel and tire unit to the hub.

Another feature of the invention is adapted to be embodied in a method for assembling wheels having attaching openings with mounted and inflated tires upon motor vehicles travelling along a conveyor. The motor vehicle has hubs with threaded fastening means for cooperation with the wheel openings for attachment of the wheel-tire unit. The method comprises the steps of orienting each hub onto which a wheel is to be mounted with its threaded fastening means in a predetermined position and orienting a wheel-tire unit with its attaching openings in alignment with the positioned threaded fastening means of the associated hub. The wheel-tire unit is then placed upon the hub and cooperating threaded fastening means are driven onto the threaded fastening means of the hub for securing the wheel and tire unit to the hub.

BRIEF DESRIPTION OF THE DRAWINGS

FIG. 4 is an enlarged, top plan view showing another station. In the station shown in FIG. 4, the remaining fasteners are installed and each wheel is finally tightened.

DETAILED DESCRIPTION OF THE PREFERRED EMBODIMENT

Figure 1:
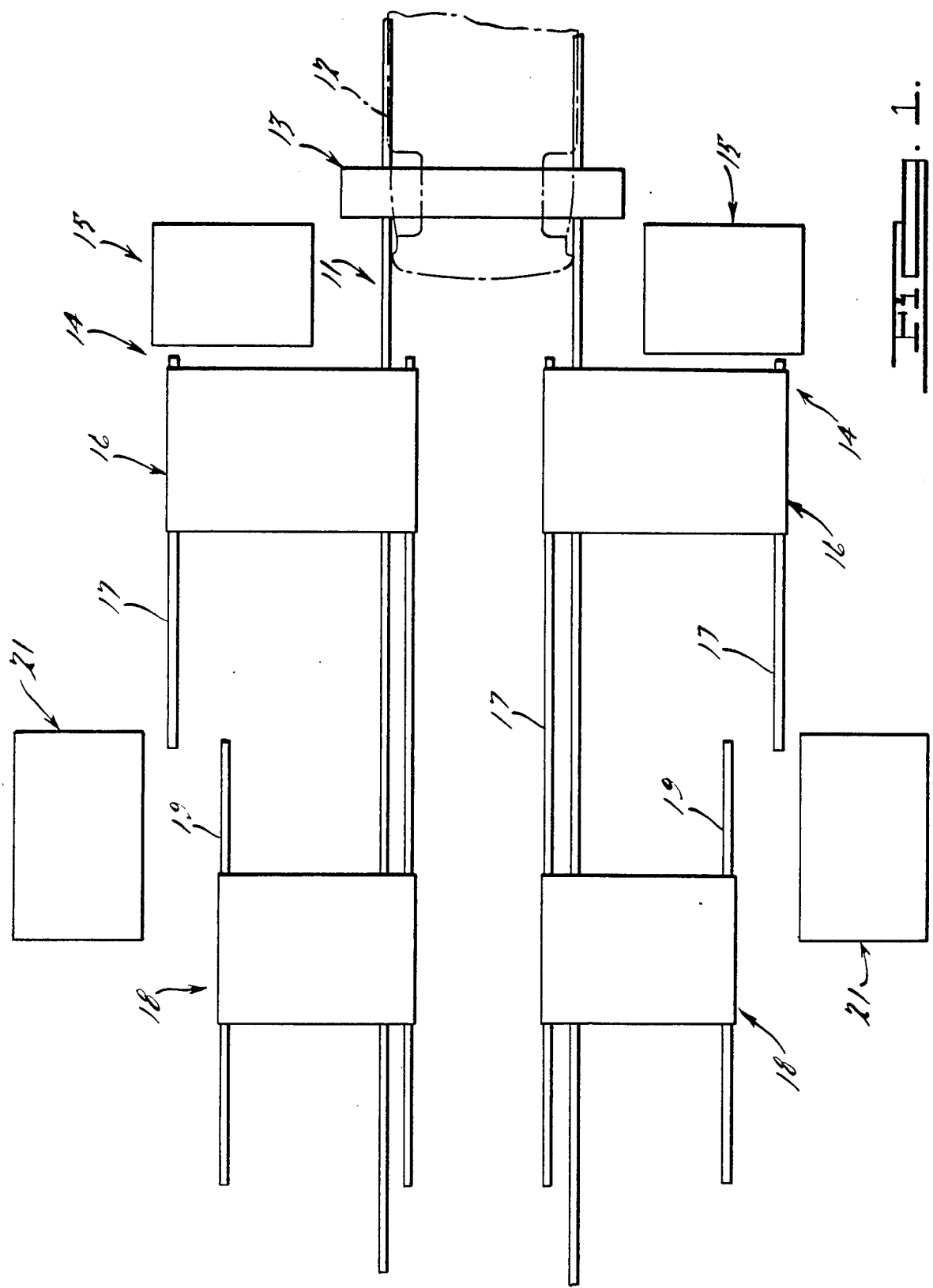
FIG. 1 is a partially schematic, top plan view of an automobile assembly line incorporating a wheel decking unit constructed in accordance with an embodiment of the invention.

Referring first generally to FIG. 1, an automative conveyor line is identified generally by the reference numeral 11. The conveyor line 11 forms a portion of a vehicle assembly plant. The vehicles may comprise automobiles, trucks or similar motor vehicles. Such a motor vehicles is shown in phantom and is identified generally by the reference numeral 12. The conveyor 11 will have moved the vehicle 12 through a number of stations (not shown) where various components are installed or other operations performed. The apparatus in question is particularly adapted for use in mounting on the vehicle hubs to be described, wheels onto which tires have been mounted and inflated. Such wheel and inflated tire assemblies will be hereinafter referred to as wheel-tire units.

The apparatus includes a number of stations in which certain operations are performed. In the illustrated embodiments, these stations include a first station, indicated generally by the reference numeral 13 and shown in more detail in FIG. 2. As will become apparent, the station 13 is intended to operate on the steered front spindles of the vehicle 12 so as to place them in a straight ahead position and also so as to centralize the forward portion of the vehicle 12 on the conveyor 11.

Downstream of the station 13 in the direction of travel of the conveyor 11 and on opposite sides of the vehicle 12 is a pair of second stations 14. The stations 14 are identical and perform similar functions on the wheels on opposite sides of the vehicle 12. These stations 14 are shown in most detail in FIG. 3 and include a first part 15 that receives a wheel-tire unit and properly orients it. The station 14 also employs a travelling station part 16 that is mounted on a track assembly 17 so that the station part 16 may move along with the vehicle 12 as it is conveyed by the conveyor 11. The station 16 performs several functions. First, it receives a positioned wheel-tire unit from the station part 15, it appropriately positions the hub of the vehicle onto which the wheel-tire unit is to be mounted, it places the wheel-tire unit on the positioned hub and partially secures it.

Downstream of the stations 14 on opposite sides of the conveyor 11 are positioned further stations, indicated generally by the reference numeral 18. Portions of the stations 18 are also mounted upon tracks 19 for movement along with the vehicle 12 as it is conveyed by the conveyor 11. The stations 18 receive further fasteners from a dispenser unit 21, and finally tighten each of the assembled wheel-tire units onto the respective vehicle hub. This station is shown in most detail in FIG. 4.

The construction and operation of each of the stations 13, 14 and 18 will now be described by particular reference to FIGS. 2, 3 and 4, respectively, wherein these stations are shown in more detail.

Figure 2:
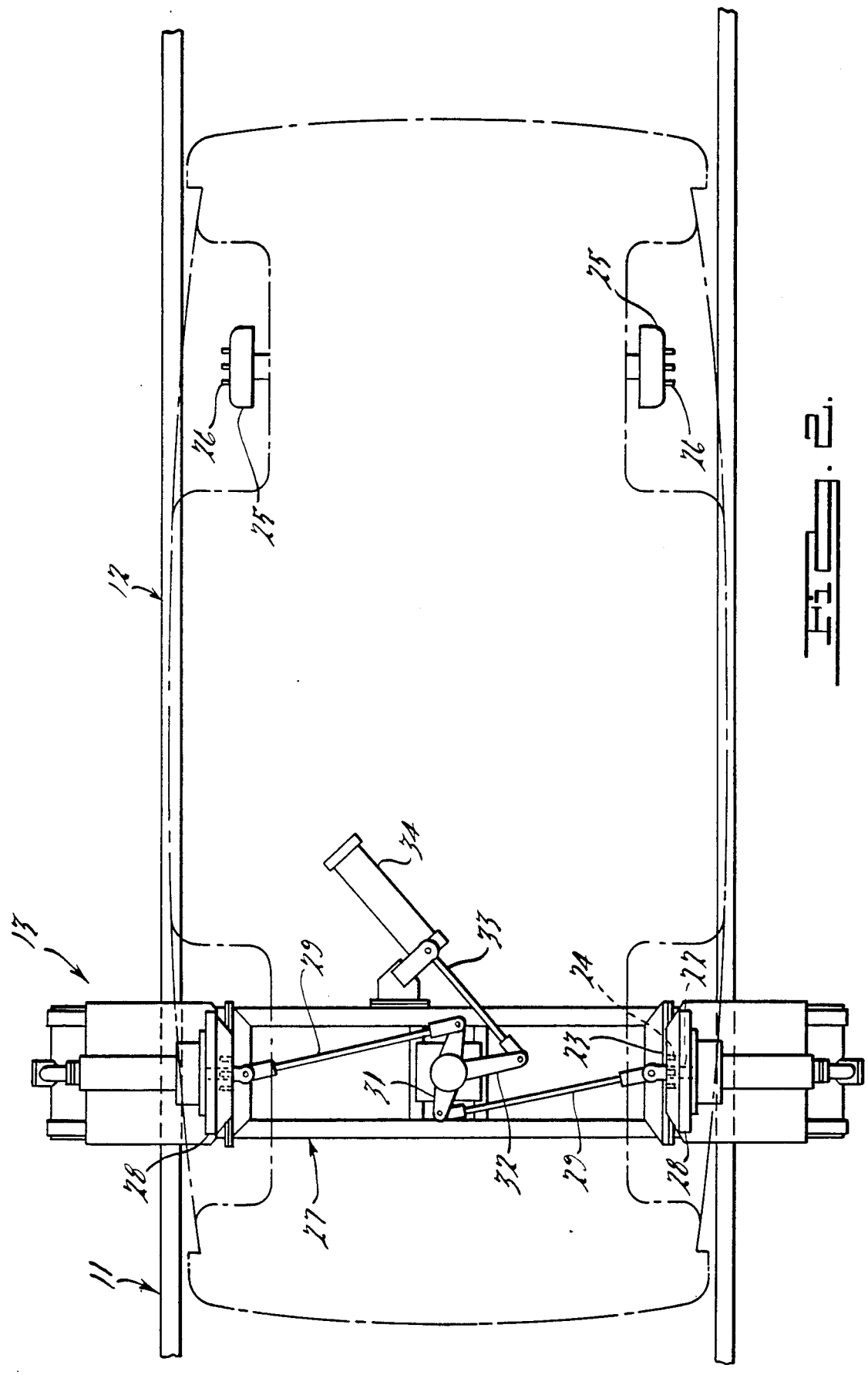
FIG. 2 is an enlarged, top plan view of a station of the line shown in FIG. 1. The station shown in FIG. 2 aligns the front spindles and centralizes the body.

Referring first to FIG. 2, a partially assembled motor vehicle is, as has been noted, identified by the reference numeral 12. The vehicle has its suspension units installed and in place and this includes front suspension units that include front wheel spindles 22 that are surrounded by and which journal front brake rotors 23. A plurality of wheel mounting and attaching studs 24 extend axially outwardly from the brake rotors 23. As is well know, the spindles 22 are connected to a suitable steering mechanism for the vehicle 12 so that they can be turned.

The vehicle also includes a back axle to which is affixed a pair of brake drums 25. As with the front wheels, a plurality of axially extending studs 26 extend from the brake drums 25 so as to attach wheels to the rear axle. The rear axle is suspended by means of a suitable suspension unit.

In the illustrated embodiment, the vehicle 12 includes front disc brakes including rotors 23 and rear drum brakes including drums 25. Furthermore, studs 24 and 26 are employed for ataching the vehicle wheels. It should be readily apparent that the invention is susceptible of use with vehicles having either disc brakes on all wheels, drum brakes on all wheels or any combination thereof. Furthermore, the invention may be used with vehicles employing other arrangements for attaching the wheel to the rotating component of the vehicle such as by using threaded bolts which thread into tapped openings in the respective brake drums and/or brake rotors. The term "hub" as used in this specification and claims is intended to refer to such rotating components and attaching devices and their equivalents.

Referring now in detail to the station 13 and its construction, as has been previously noted, the station 13 is intended to align the front spindles 22 and so as to centralize the vehicle 12 with respect to the conveyor 11 and the associated following stations.

The station 13 comprises a frame assembly 27 that underlies the conveyor 11 and which supports a pair of transversely movable spindle engaging and aligning members 28. The aligning members 28 are adapted to engage the brake rotors 23 and spindles 22 upon axial movement so as to align these members in a perpendicular direction with respect to the frame 27 and also with respect to the conveyor 11. In addition, the members 28 engage the rotors 23 and spindles 22 with sufficient force so as to transversely locate the front of the vehicle 12 in a centralized manner with respect to the conveyor 11.

In order to achieve these functions, the members 28 are connected to one end of respective links 29 by means of pivot pins. The opposite ends of the links 29 are connected to respective ends of a bellcrank 31 that is supported for rotation about a vertically extending axis that is positioned on the center line of the conveyor 11. The bellcrank 31 has a further outwardly extending arm 32 that is connected by means of a pivot pin to a rod 33 of a pneumatic piston and cylinder assembly 34 which is, in turn, pivotally supported on the frame 27.

Reciprocation of the piston rod 33 will cause pivotal movement of the bellcrank 31 and reciprocation of the members 28 from the engaged position, as shown in FIG. 2, to a disengaged position wherein the members 28 are spaced sufficiently apart so as to permit a vehicle 12 to move into the station 13. When a vehicle is present in the station 13, the cylinder 34 is actuated so as to rotate the bellcrank 31 in a clockwise direction and cause the members 28 to engage the spindles 22 and brake rotors 23. This engagement will cause the spindles 22 and rotors 23 to assume a straight ahead position and, furthermore, the cylinder 34 will develop sufficient pressure so as to cause the front of the vehicle 12 to be centralized on the conveyor 11. The cylinder 34 is then again actuated so as to retract the members 28 so that the vehicle 12 may be moved on to the next station 14.

As the vehicle 12 is indexed forwardly, the rear axle will come into alignment with the station 13. The cylinder 34 can again be actuated at this time so as to bring the aligning members 28 into engagement with the rear drums 25. This engagement will centralize the rear of the vehicle 12 relative to the conveyor 11.

Figure 3:
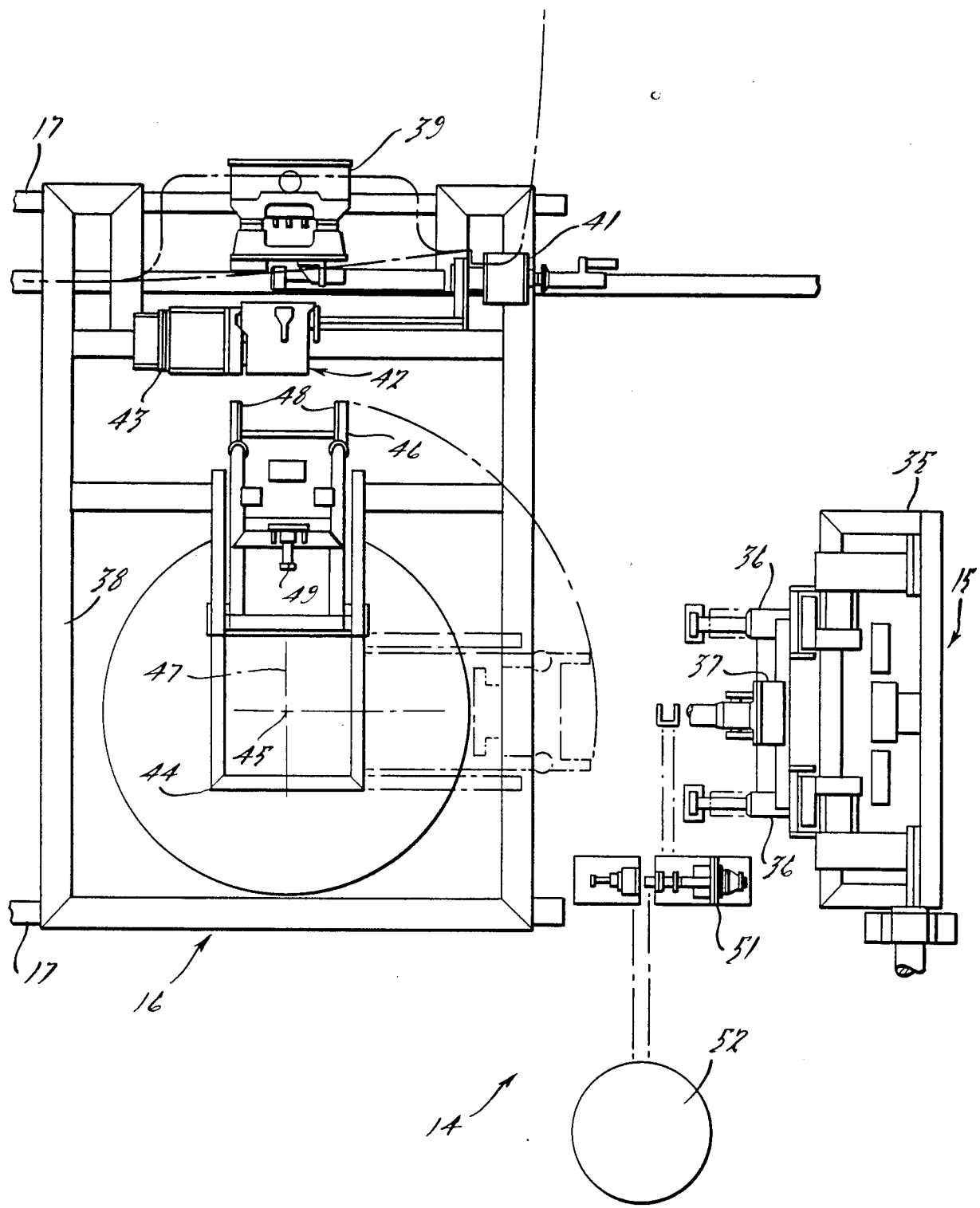
FIG. 3 is an enlarged, top plan view showing another of the stations. In the station shown in FIG. 3, wheels are centralized, positioned, mounted onto the hub of the vehicle and one fastening unit applied.

Referring now to FIG. 3, several things are accomplished in the station 14. As has been previously noted, there are corresponding stations 14 positioned on each side of the conveyor 11. For that reason, only the construction at one side will be described by particular reference to FIG. 3. As has been noted, the unit 15 is adapted to receive wheel-tire units from a conveyor (not shown). The wheel-tire units are fed to the unit 15 by means of a computer control so that appropriate pairs of wheels for the vehicle 12 will be presented in sequence to the unit 15.

The unit 15 includes a frame 35 that drives a pair of rollers 36 that are adapted to engage the periphery of the tire of the presented wheel-tire unit. A sensing head 37 is positioned centrally of the rollers 36 and is adapted to read the wheel center and specifically the holes formed in it that permit attachment to the studs 24, 26 of the front or rear hubs of the vehicle 12 so as to rotatably attach the wheel-tire unit to the respective hubs. The rollers 36 are actuated until the sensing unit 37 senses the presence of one of the holes at the desired angular rotation. The rollers 36 are then stopped so as to present the properly oriented wheel-tire unit to the unit 16.

The unit 16 includes a frame assembly 38 which is supported on the tracks 17 so that the frame assembly 38 and unit 16 may move along with a vehicle 12 on the conveyor 11, as will become apparent. The frame 38 supports, at a point beneath the conveyor 11, a suspension engaging and lifting unit 39. The unit 39 is actuted by means of a pneumatic motor driven screw jack (not shown) and is adapted to engage a suitable point on both the front and rear suspension of the vehicle 12 so that the associated hub consisting of either the brake rotor 23 or the brake drum 25 may be lifted slightly. When the appropriate suspension unit of either the front disc 23 or rear drum 25 is lifted, the unit 16 and specifically the frame 38 will be carried along the track 17 in synchronism with the travel of the vehicle 12 on the conveyor 11. The unit 39 includes a drive unit 41 that may be operated to return the frame 38 along the tracks 17 after the work at this station has been completed.

Juxtaposed to the suspension lifting unit 39 is a device, indicated generally by the reference numeral 42, that is adapted to sense the location of one of the studs 24 or 26 depending upon whether the wheel to be mounted is a front wheel or rear wheel and to rotate either the rotor 23 or the drum 25 to appropriately align the studs in the desired angular position. The angular position is one which matches that of the wheel-tire unit that has been set by the unit 15.

After the unit 42 has located and rotated the studs so as to align them, it is retracted out of the way by a suitable drive member 43.

The frame 38 also supports a subframe 44 that is rotatable about a vertically extending axis 45° through 90° from a position for mounting a wheel and tire unit on the vehicle 12 as shown in solid lines in this figure and for a position in which a wheel and tire unit can be removed from the unit 15, as shown in the phantom line view. For this purpose, a wheel supporting member 46 is supported on the subframe 44 for movement along a line defined by the subframe 44 and indicated at 47. The member 46 has a pair of spaced jaws 48 that are transversely movable so as to engage the inner flange of the rim of the wheel-tire unit so as to hold it. The jaws 48 are reciprocated by a suitable drive member between a closed and opened position.

A nut runner 49 is also positioned on the subframe 44 and is axially movable along the line 47 between a retracted position and an operative position for driving a nut onto one of the studs 24, 26.

A nut loading and dispensing unit 51 is juxtaposed to the units 15 and 16 and receives nuts from a nut feeder 52. These nuts are sequentially fed to the nut driver 49 in a manner now to be described.

The units 15, 16 and 51 cooperate as follows. A tire is fed to the unit 15 on the rolls 36 for rotation and positioning. At this time, the frame 44 is pivoted about the axis 45 so that the wheel supporting member 46 will be juxtaposed to the unit 15. At the same time, the nut loading unit 51 receives a nut from the dispenser 52 and feeds it to the nut runner 49. The members 48 are retracted inwardly and the member 46 is extended along the line 47 so that a wheel will be transferred from the unit 15 to the unit 46. The jaws 48 are spread so as to grasp the inside of the wheel-tire unit.

While this operation is taking place, the suspension lifting unit 39 will be positioned beneath either the front or rear suspension and will raise it. Once the suspension is raised, the entire unit 16 will move along the track 17 along with the vehicle 12. A wheel-tire unit will already be received on the supporting unit 46 by this time.

When this movement is begun, the stud aligning unit 42 will begin its operation and will rotate either the brake rotor 23 or drum 26 so as to appropriately align the studs 24 or 26. When these studs have been aligned, the unit 42 is retracted by the drive member 43. During the retraction of the unit 42, the subframe 44 is rotated about the axis 45 so that the wheel-tire unit is aligned along the line 47. The member 46 is then extended so as to place the wheel-tire unit on the studs 24, 26. Once the wheel-tire unit is mounted over the studs 24, 26, the nut driver 49 is operated so as to stake the wheel-tire unit in place. The unit 46 and nut driver 49 are then retracted and the suspension lifting unit 39 is lowered. The unit 16 is then returned to its home position by the drive 41 and the cycle of operation can be repeated on the next presented hub. This may be the rear drum 25 of the vehicle 12 or the front rotor 23 of the next presented vehicle.

Referring now to FIG. 4, the station 18 is also supported for movement on the tracks 17 and 19, as has been previously noted, and includes a frame assembly 53. A suspension lift unit 55 is carried by the frame 53 and is adapted to lift the suspension of the associated wheel of the vehicle 12, which as has been noted, is now secured to the vehicle by one nut. The suspension lift unit 55 may comprise a pneumatic motor that drives a screw jack. When the lift unit 55 lifts the vehicle, the frame assembly 53 and units carried by it will be carried along the tracks 17 and 19 with the associated vehicle. The frame assembly 53 supports a drive unit 54 that is adapted to drive the frame assembly 53 back to its home position.

A nut runner assembly 56 is supported on a guide frame 57 which is, in turn, supported by the frame 53 for rotation about a vertically extending axis 58. The assembly 56 is also axially movable and is rotated through 180° by a suitable drive mechanism.

Juxtaposed to the unit 18 is a nut loader and dispenser assembly 59 that receives nuts from a hopper/feeder 61. When the nut runner 56 is rotated to the dotted line position as shown in this figure and is aligned with the feeder 59, it will receive the remaining nuts for the studs 24, 26.

The station 18 operates as follows. The frame 53 is positioned at a home location and the nut running unit 56 is rotated so that it will register with the nut feeding unit 59. Nuts are then delivered to it. When a vehicle hub arrives at the station 18, the suspension lift unit 55 will be actuated so as to couple the frame 53 to the vehicle. The frame 53 will be moved along the rails 17 and 19 in unison with the vehicle 12. The unit 57 is then rotated and the nut runner 56 is extended so as to move into registry with the studs 24, 26. The nuts are then driven onto the studs with the appropriate torque and the unit 56 is retracted. The suspension unit 55 is then lowered and the motor 54 returns the frame 53 to its home position.

It should be readily apparent from the foregoing description that an extremely effective yet relatively simple device has been provided for assembling wheel-tire units onto vehicles. In the illustrated and described embodiment, the wheel-tire units are first fastened by one nut. It should be readily apparent, however, that the device may be operated in such a manner that the wheel-tire unit is placed onto the vehicle hub at one location and all of the nuts are inserted at another station. Also, the device can be used with other types of wheel attachment mechanisms such as those embodying bolts rather than a stud nut arrangement. Various other changes and modifications may be made, without departing from the spirit and scope of the invention, as defined by the appended claims.

We claim:

1. Fully automated apparatus for assembling wheels having attaching openings with mounted and inflated tires upon motor vehicles travelling along a conveyor the motor vehicles having hubs with threaded fastening means for cooperation with the wheel openings for attachments of the wheel-tire unit, said apparatus comprising means for automatically orienting each hub upon which a wheel is to be mounted with its threaded fastening means in a predetermined position, means for automatically orienting a wheel-tire unit with its attaching openings positioned in alignment with the positioned threaded fastening means of the associated hub, mounting means for automatically placing the wheel-tire unit onto the hub, and means for threading cooperating threaded fastening means onto the hub threaded fastening means for securing the wheel-tire unit to the hub.

2. A apparatus as set forth in claim 1 further including means for aligning the vehicle relative to the apparatus.

3. An apparatus as set forth in claim 2 wherein the means for orienting the hub includes means for centralizing the steered front hubs of the vehicle and for centralizing the vehicle relative to the apparatus.

4. An apparatus as set forth in claim 3 wherein the apparatus further includes means for centralizing the rear of the vehicle relative to the apparatus.

5. An apparatus as set forth in claim 1 wherein the means for orienting the hub is adapted to sequentially orient front hubs and rear hubs.

6. An apparatus as set forth in claim 1 wherein the means for threading the cooperated threaded fastening means onto the hub includes a first station for affixing a first threaded fastening means onto the hub and a second station for affixing the remaining threaded fastening means onto the hub.

7. An apparatus as set forth in claim 1 wherein the means for orienting the hub includes means for affixing the orienting means for movement with the vehicle along the conveyor.

8. A method for fully automating the assembling of wheels having attaching openings with mounted and inflated tires upon motor vehicles travelling along a conveyor comprising the steps of orienting the vehicle hubs with their threaded fastening means in a predetermined position, orienting a wheel-tire unit with its attaching openings positioned in alignment with the position threaded fastening means of the associated hub, placing the wheel-tire unit onto the hub, and affixing a threaded fastening means onto the hub threaded fastening means for affixing the wheel-tire unit to the hub.

9. Apparatus for automatically assembling wheels having attaching openings and mounted and inflated tires upon motor vehicles traveling along a conveyor, the motor vehicles having hubs with threaded fastening means for cooperation with the wheel openings for attachment of the wheel-tire unit, said apparatus comprising:
   wheel-tire orienting means operative to receive a wheel-tire unit from delivery means and to automatically rotate said wheel-tire unit so as to orient said openings in a predetermined position;
   positioning means operative to automatically position each of said hubs in a predetermined location and to orient said hub threaded fastening means in a position to be in alignment with said attaching openings in said wheel;
   mounting means for automatically placing said wheel-tire unit on said hub; and
   securing means for threading cooperating threaded fastening means through said openings onto said hub threaded fastening means to secure said wheel-tire unit to said hub.

10. An apparatus as set forth in claim 9 wherein said wheel-tire orienting means include sensing means operative to control operation of means for effecting rotation of said wheel-tire unit and to halt rotation thereof in response to the sensed presence of one of said openings.

11. An apparatus as set forth in claim 9 wherein said positioning means includes means to vertically position said hubs and means to position said hub fastening means in a plane extending substantially parallel to the direction of movement of said vehicle along said conveyor.

12. An apparatus as set forth in claim 11 wherein said mounting means and said securing means include means for effecting movement thereof in a direction substantially parallel to and in synchronism with the movement of said vehicle along said conveyor.

* * * * *

UNITED STATES PATENT AND TRADEMARK OFFICE
CERTIFICATE OF CORRECTION

PATENT NO. : 4,635,339
DATED : January 13, 1987
INVENTOR(S) : Chester P. Kozlowski et al It is certified that error appears in the above-identified patent and that said Letters Patent is hereby corrected as shown below:

ON THE TITLE PAGE:

The title "AUTOMATED WHEEL DECKING ASSEMBLING" should be
--AUTOMATED WHEEL DECKING--.

Signed and Sealed this

Third Day of November, 1987

Attest:

DONALD J. QUIGG

Attesting Officer

Commissioner of Patents and Trademarks